(12) United States Patent
Lv et al.

(10) Patent No.: US 11,374,467 B2
(45) Date of Patent: Jun. 28, 2022

(54) AIR PRE-CLEANING ASSEMBLY AND ELECTRIC TOOL HAVING SAME

(71) Applicants: Bosch Power Tools (China) Co., Ltd., Zhejiang (CN); Robert Bosch GmbH, Stuttgart (DE)

(72) Inventors: Weiwei Lv, Zhejiang (CN); Xing Wu, Zhejiang (CN); Jiguo Liu, Zhejiang (CN)

(73) Assignees: Bosch Power Tools (China) Co., Ltd., Hangzhou (CN); Robert Bosch GmbH, Stuttgart (DE)

(*) Notice: Subject to any disclaimer, the term of this patent is extended or adjusted under 35 U.S.C. 154(b) by 363 days.

(21) Appl. No.: 16/486,226

(22) PCT Filed: Feb. 13, 2018

(86) PCT No.: PCT/CN2018/076594
§ 371 (c)(1),
(2) Date: Aug. 15, 2019

(87) PCT Pub. No.: WO2018/149388
PCT Pub. Date: Aug. 23, 2018

(65) Prior Publication Data
US 2020/0099275 A1 Mar. 26, 2020

(30) Foreign Application Priority Data
Feb. 16, 2017 (CN) .......................... 201710083909.1

(51) Int. Cl.
*H02K 9/26* (2006.01)
*B01D 45/16* (2006.01)
(Continued)

(52) U.S. Cl.
CPC ............... *H02K 9/26* (2013.01); *B01D 45/16* (2013.01); *B25F 5/008* (2013.01); *B04C 3/00* (2013.01)

(58) Field of Classification Search
CPC .......... H02K 9/26; B01D 45/16; B01D 45/12; B25F 5/008; B25F 5/00; B04C 3/00
See application file for complete search history.

(56) References Cited

U.S. PATENT DOCUMENTS 6,406,505 B1 * 6/2002 Oh ........................ A47L 9/1666
55/337
8,080,075 B2 * 12/2011 Doering ............... F02M 35/022
55/337
(Continued)

FOREIGN PATENT DOCUMENTS

CN 102294653 A 12/2011
CN 202701969 U 1/2013
(Continued)

OTHER PUBLICATIONS

International Search Report corresponding to PCT Application No. PCT/CN2018/076594, dated May 16, 2018 (Chinese and English language document) (6 pages).

*Primary Examiner* — Dung H Bui
(74) *Attorney, Agent, or Firm* — Maginot, Moore & Beck LLP

(57) ABSTRACT

An air pre-cleaning assembly includes a motor that has a stator and a rotor shaft assembly configured with a fan. The motor is disposed at the upstream of the fan, and rotation of the fan is configured to yield an air flow passing through the motor. A cyclone separating element on the upstream path of the air flow on the motor includes an air inlet, a separating chamber, a dust collecting chamber, and an air outlet. The separating chamber is communicated with the air inlet. The dust collecting chamber is communicated with the separat-
(Continued)

ing chamber and located at its outer periphery. The air outlet is communicated with the separating chamber and located at its inner periphery. The motor is located at the downstream of the air outlet. The cyclone separating element allows clean air filtered by cyclone filtering to pass through the motor via the air outlet.

17 Claims, 4 Drawing Sheets

(51) Int. Cl.
 *B25F 5/00* (2006.01)
 *B04C 3/00* (2006.01)

(56) References Cited

U.S. PATENT DOCUMENTS

| | | | | |
|---|---|---|---|---|
| 8,679,211 | B1* | 3/2014 | Makarov | A47L 9/1641 |
| | | | | 55/343 |
| 9,233,320 | B2* | 1/2016 | Moen | B04C 5/181 |
| 10,537,219 | B2* | 1/2020 | Conrad | A47L 5/28 |
| 10,537,220 | B2* | 1/2020 | Cho | B01D 50/002 |
| 2002/0189560 | A1* | 12/2002 | Linsbauer | F01P 11/12 |
| | | | | 123/41.65 |
| 2004/0094114 | A1* | 5/2004 | Riehmann | F02M 35/022 |
| | | | | 123/198 E |
| 2005/0153636 | A1* | 7/2005 | Numata | B25F 5/008 |
| | | | | 451/358 |
| 2006/0150591 | A1* | 7/2006 | Borinato | B23Q 11/0046 |
| | | | | 55/385.1 |
| 2007/0214756 | A1* | 9/2007 | Lee | B04C 5/04 |
| | | | | 55/419 |
| 2007/0266683 | A1* | 11/2007 | McDowell | A47L 5/362 |
| | | | | 55/429 |
| 2008/0104936 | A1* | 5/2008 | Kellermann | B24B 27/08 |
| | | | | 55/357 |
| 2009/0165431 | A1* | 7/2009 | Oh | B04C 5/08 |
| | | | | 55/337 |
| 2009/0282791 | A1* | 11/2009 | Lang | B04C 5/26 |
| | | | | 55/326 |
| 2010/0132316 | A1* | 6/2010 | Ni | B04C 5/24 |
| | | | | 55/343 |
| 2010/0224073 | A1* | 9/2010 | Oh | A47L 9/1683 |
| | | | | 96/416 |
| 2015/0257617 | A1* | 9/2015 | Marsden | A47L 9/1641 |
| | | | | 55/343 |
| 2016/0206169 | A1* | 7/2016 | Hyun | A47L 9/165 |
| 2017/0136614 | A1* | 5/2017 | Takeda | B24B 23/02 |
| 2017/0216941 | A1* | 8/2017 | Petersson | H02K 5/20 |
| 2017/0306900 | A1* | 10/2017 | Doring | F02M 35/022 |
| 2018/0250803 | A1* | 9/2018 | Xie | F16H 3/44 |
| 2019/0343356 | A1* | 11/2019 | Kim | A47L 9/1683 |

FOREIGN PATENT DOCUMENTS

| | | | | |
|---|---|---|---|---|
| CN | 206493278 U | | 9/2017 | |
| EP | 2 946 887 A1 | | 11/2015 | |
| JP | 2013049114 A | * | 3/2013 | |
| JP | 2013059663 A | * | 4/2013 | |
| JP | 2013226617 A | * | 11/2013 | B23Q 11/127 |

* cited by examiner

AIR PRE-CLEANING ASSEMBLY AND ELECTRIC TOOL HAVING SAME

This application is a 35 U.S.C. § 371 National Stage Application of PCT/CN2018/076594, filed on Feb. 13, 2018, which claims the benefit of priority to Ser. No. CN 201710083909.1, filed on Feb. 16, 2017 in China, the disclosures of which are incorporated herein by reference in their entirety.

The present application relates to an electric motor, and more particularly to the field of air pre-cleaning of electric motors.

Electric motors, such as those used in electric tools, often contain particulate matter in cooling airflow thereof, and this particulate matter may cause severe damage to the electric tool if it enters the interior of a tool assembly. It is therefore advantageous to reduce the level of particulate matter in the airflow somewhere upstream of an operating mechanism (such as an electric motor or other apparatus). Air pre-cleaners are commonly used to separate particulate matter from the airflow. At present, in the industry, this is mainly implemented by providing a particle separation unit with an independent power system, or a complex follow-up separation unit, which still has defects such as a high cost and a complex design.

Therefore, it is necessary to make improvements to overcome the technical problems existing in the prior art.

SUMMARY

The main problem to be solved by this application is the air pre-cleaning problem of an electric motor.

In order to solve the above technical problem, in one aspect, the present application provides an electric tool comprising a housing and a tool assembly assembled on the housing, the tool assembly comprising: an end output shaft capable of clamping an accessory and an electric motor for directly or indirectly driving the end output shaft, wherein the electric motor comprises a stator and a rotor shaft assembly; the rotor shaft assembly further comprises a fan which can generate an airflow; the airflow flows through the electric motor; a cyclone separation unit is disposed in the path of the airflow upstream of the electric motor; and the cyclone separation unit comprises an air inlet, a cyclone separation chamber communicating with the air inlet, a cyclone dust collecting chamber communicating with the cyclone separation chamber and located at the outer periphery of the cyclone separation chamber, and an air outlet communicating with the cyclone separation chamber and located at the inner periphery of the cyclone separation chamber, with the electric motor being located downstream of the air outlet.

In still another aspect, the present application also provides an air pre-cleaning assembly, which comprises an electric motor having a stator and a rotor shaft assembly that is assembled with a fan, wherein the electric motor is located upstream of the fan; the rotation of the fan can produce an airflow flowing through the electric motor; a cyclone separation unit is disposed in the path of the airflow upstream of the electric motor; and the cyclone separation unit comprises an air inlet, a cyclone separation chamber communicating with the air inlet, a cyclone dust collecting chamber communicating with the cyclone separation chamber and located at the outer periphery of the cyclone separation chamber, and an air outlet communicating with the cyclone separation chamber and located at the inner periphery of the cyclone separation chamber, with the electric motor being located downstream of the air outlet.

According to the present application, the cyclone separation unit disposed upstream of the electric motor enables cyclone-filtered clean air to flow through the electric motor through the air outlet, and the design is compact and simple, and the safety is also improved.

According to an aspect of the present application, an electric tool is provided which comprises a housing and a tool assembly assembled on the housing, the tool assembly comprising: an end output shaft capable of clamping an accessory and an electric motor for directly or indirectly driving the end output shaft, the electric motor comprising a stator and a rotor shaft assembly, the rotor shaft assembly further comprising a fan which can generate an airflow, the airflow flowing through the electric motor, characterized in that a cyclone separation unit is disposed in the path of the airflow upstream of the electric motor, and the cyclone separation unit comprises an air inlet, a cyclone separation chamber communicating with the air inlet, a cyclone dust collecting chamber communicating with the cyclone separation chamber and located at the outer periphery of the cyclone separation chamber, and an air outlet communicating with the cyclone separation chamber and located at the inner periphery of the cyclone separation chamber, with the electric motor being located downstream of the air outlet.

Optionally, the airflow flows through a stator-rotor gap of the electric motor and/or a motor-housing backlash.

Optionally, the cyclone dust collecting chamber has a particle discharge port.

Optionally, the cyclone dust collecting chamber further comprises a cover that can close the particle discharge port by a negative pressure generated by the airflow.

Optionally, the electric tool has a switch for controlling the start-up of the electric motor, and the cyclone dust collecting chamber further comprises a cover which can be in linkage with the switch to open and close the particle discharge port.

Optionally, the switch sets, in a linkage manner, the start and stop of the electric motor and the opening and closing of the cover as: before the electric motor is started, the cover is closed first; and before the cover is opened, the electric motor is stopped first.

Optionally, the end output shaft is perpendicular to the rotor shaft assembly, the end output shaft has a free end facing a working side, and the particle discharge port is open to the working side.

Optionally, the cyclone dust collecting chamber extends to the working side to form an extended dust collecting chamber, and the particle discharge port is provided at a lower portion of the extended dust collecting chamber.

Optionally, the cyclone separation unit has several air inlets distributed in a circumferential direction, and the air inlets enter the cyclone separation chamber in a tangential direction.

Optionally, the housing is provided with several intake grilles corresponding to the air inlets.

Optionally, the cyclone separation unit is prefabricated as a whole and can be modularly assembled on the electric tool.

Optionally, the inner wall of the cyclone dust collecting chamber is provided with several strip-like or spot-like protrusions which promote sedimentation of particles.

Optionally, the cyclone dust collecting chamber is disposed in whole or in part as a see-through chamber allowing for observing the amount of dust collected.

Optionally, the electric tool is an angle grinder, an electric hammer, a circular saw, an electric drill or a cutting machine.

According to another aspect of the present application, an air pre-cleaning assembly is provided which comprises an electric motor having a stator and a rotor shaft assembly that is assembled with a fan, the electric motor being located upstream of the fan, and the rotation of the fan being able to produce an airflow flowing through the electric motor, characterized in that a cyclone separation unit is disposed in the path of the airflow upstream of the electric motor, and the cyclone separation unit comprises an air inlet, a cyclone separation chamber communicating with the air inlet, a cyclone dust collecting chamber communicating with the cyclone separation chamber and located at the outer periphery of the cyclone separation chamber, and an air outlet communicating with the cyclone separation chamber and located at the inner periphery of the cyclone separation chamber, with the electric motor being located downstream of the air outlet.

Optionally, the cyclone separation unit has several air inlets distributed in a circumferential direction, and the air inlets enter the cyclone separation chamber in a tangential direction.

Optionally, the cyclone dust collecting chamber has a particle discharge port.

Optionally, the cyclone dust collecting chamber further comprises a cover that can open and close the particle discharge port actively or passively.

BRIEF DESCRIPTION OF THE DRAWINGS

The present application will be more fully understood by referring to the following detailed description of specific embodiments taken in conjunction with the accompanying drawings. In the figures.

DETAILED DESCRIPTION

Figure 1:
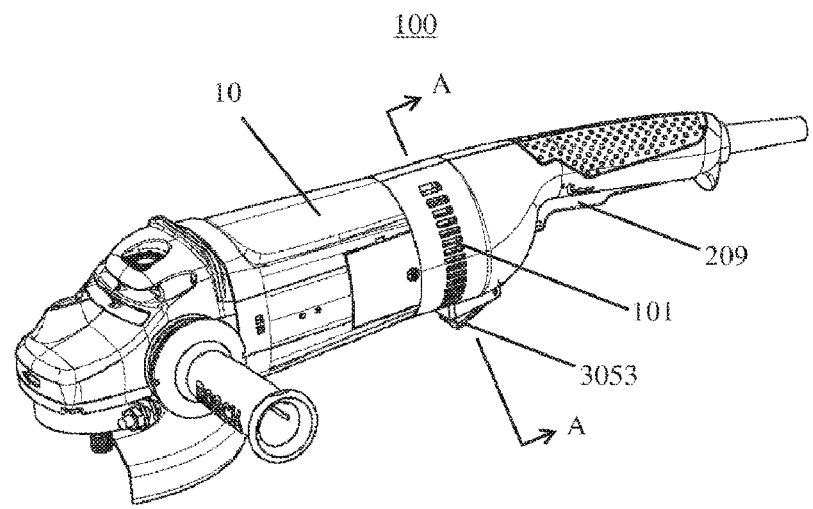
FIG. 1 is a schematic perspective structural view showing an electric tool of the present application.
Figure 2:
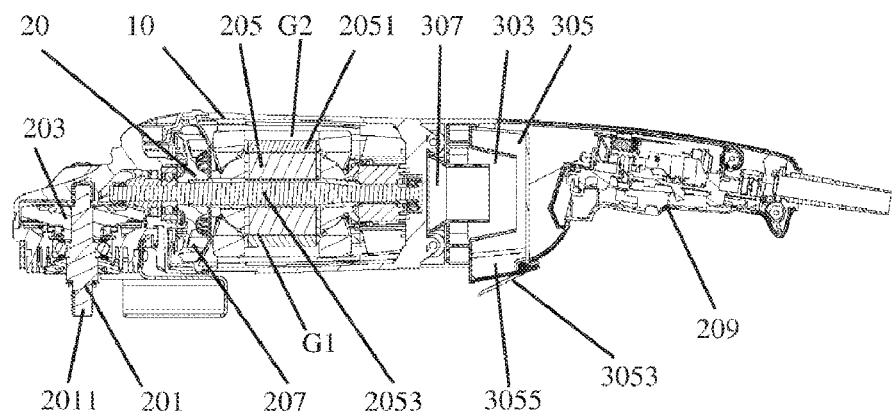
FIG. 2 is a schematic cross-sectional structural view showing the electric tool of FIG. 1.
Figure 3:
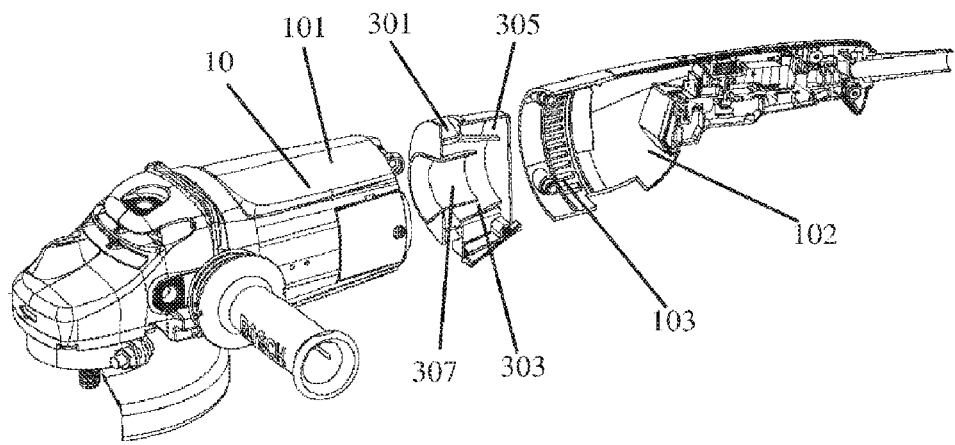
FIG. 3 is a schematic exploded structural view showing the electric tool of FIG. 1.
Figure 4:
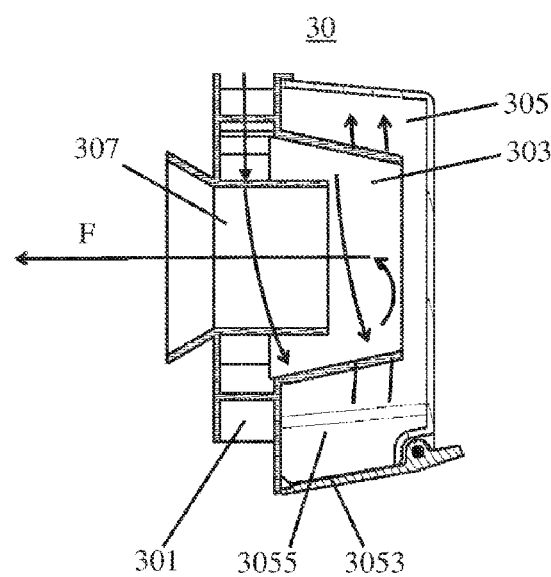
FIG. 4 is a schematic front cross-sectional structural view of a cyclone separation unit of FIG. 3.
Figure 5:
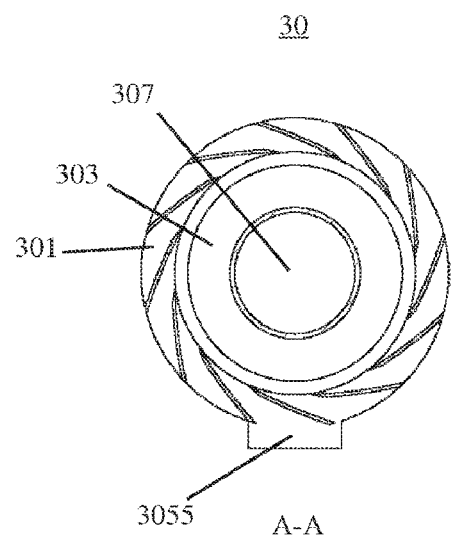
FIG. 5 is a schematic cross-sectional structural view showing the cyclone separation unit of the present application taken along the A-A direction in FIG. 1.

Specific embodiments of the electric tool 100 of the present application are described in detail below with reference to the accompanying drawings.

Referring to FIG. 1 to FIG. 5, the electric tool 100 of this embodiment is an angle grinder, which comprises a housing 10 and a tool assembly 20 assembled on the housing 10. The housing 10 comprises a front housing 101 and a rear housing 102, and the tool assembly 20 is specifically assembled in the front housing 101. The tool assembly 20 comprises: an end output shaft 201 capable of clamping an accessory, a gear set 203 driving the end output shaft 201, and an electric motor 205 driving the gear set 203, wherein the electric motor 205 comprises a stator 2051 and a rotor shaft assembly 2053; the rotor shaft assembly 2053 is also assembled with a fan 207 which can generate an airflow F; the electric motor 205 is located upstream of the fan 207; the airflow F flows through the electric motor 205; a cyclone separation unit 30 is disposed in the path of the airflow F upstream of the electric motor 205; and the cyclone separation unit 30 comprises an air inlet 301, a cyclone separation chamber 303 communicating with the air inlet 301, a cyclone dust collecting chamber 305 communicating with the cyclone separation chamber 303 and located at the outer periphery of the cyclone separation chamber 303, and an air outlet 307 communicating with the cyclone separation chamber 303 and located at the inner periphery of the cyclone separation chamber 303, with the air outlet 307 leading to the electric motor 205. The fan 207 sucks cyclone formed in the cyclone separation chamber 303, then separates large mass particles such as dust into the cyclone dust collecting chamber 305, and sends the processed clean air to the electric motor 205 through the air outlet 307 to participate in work, employing a simple and efficient structural design to ensure safety of the electric motor and tool. The electric tool further comprises a switch 209 that controls the start-up of the electric motor 205, and the cyclone separation unit 30 and the switch 209 are assembled at the rear housing 102. The design of front and rear housings is configured to effectively receive the cyclone separation unit 30 with a high disassembly requirement in the rear housing 102, and to receive the tool assembly 20 with a low disassembly requirement in the front housing 101, thereby separating them and reducing the assembly and disassembly time and accuracy change.

The electric motor 20 in this embodiment is located upstream of the fan 207, the airflow F specifically flows through a stator-rotor gap G1 of the electric motor 207 and/or a motor-housing backlash G2, the cyclone separation unit 30 is disposed in the path of the airflow upstream of the stator-rotor gap G1 and/or the motor-housing backlash G2, and the cyclone dust collecting chamber 305 has a particle discharge port 3051 for discharging particles such as the dust collected in the cyclone dust collecting chamber 305 in time. The end output shaft 201 is perpendicular to the rotor shaft assembly 2053, the end output shaft 201 has a free end 2011 facing a working side, and the particle discharge port 3051 is open to the working side. The design that the particle discharge port 3051 is disposed on the working side consistent with the end output shaft 201 not only conforms to the user's operating habit for an angle grinder, but also satisfies the design compactness requirement of the angle grinder itself.

The cyclone dust collecting chamber 305 further comprises a cover 3053 that can close the particle discharge port 3051 by a negative pressure generated by the airflow F. The cover may be in the form of turning over by means of a pivot, and may also be in the form of a soft rubber sleeve, as long as it can be attracted to be closed when the fan 207 is operated to generate the negative pressure. The cyclone dust collecting chamber 305 extends to the working side to form an extended dust collecting chamber 3055, and the particle discharge port 3051 is provided at a lower portion of the extended dust collecting chamber 3055. The cyclone dust collecting chamber 305 has a cone cylindrical shape, and the extended dust collecting chamber 3055 is formed by being recessed toward the working side on the basis of the cone cylindrical shape, so that the particles falling into the extended dust collecting chamber 3055 exit a main cyclone area and are relatively difficult to be raised again, thus the dust collection amount of the cyclone dust collecting chamber 305 is also objectively improved. The inner wall of the cyclone dust collecting chamber 305 is provided with several strip-like or spot-like protrusions (not shown) which promote sedimentation of the particles to help the particles decelerate and then deposit.

With continued reference to FIG. 1 to FIG. 5, the cyclone separation unit 30 is prefabricated as a whole and can be modularly assembled on the electric tool 100, so that it can be easily disassembled, cleaned and replaced when dust builds up on the wall surface after multiple use. Of course, the cyclone separation unit 30 can also be closed by means of an existing structure in part, for example, a part of the outer wall of the cyclone dust collecting chamber 305 can be opened, and in combination with the housing in the vicinity of the switch. The housing 10 is provided with several intake grilles 103 corresponding to the air inlet 301. In this way, the air entering the cyclone separation unit 30 can be coarsely filtered to prevent oversized particles from entering and damaging the cyclone separation unit 30. Several air inlets 301 in the cyclone separation unit 30 are distributed in a circumferential direction to draw in a larger amount of air. The air inlets 301 enter the cyclone separation chamber 303 in a tangential direction so as to enter the swirl flow at the most direct angle and direction after entering the cyclone separation chamber 303, thereby improving the separation efficiency. In addition, the cyclone dust collecting chamber 305 may also be disposed in whole or in part as a see-through chamber allowing for observing the amount of dust collected, so as to perform corresponding processing in an intuitive and timely manner.

Figure 6:
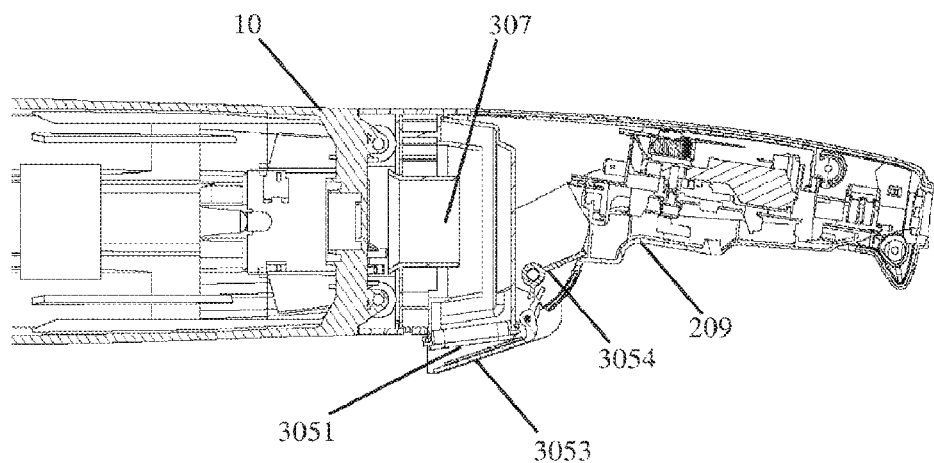
FIG. 6 is a schematic partial cross-sectional structural view showing a cover of an electric tool according to a second embodiment of the present application in an open state.
Figure 7:
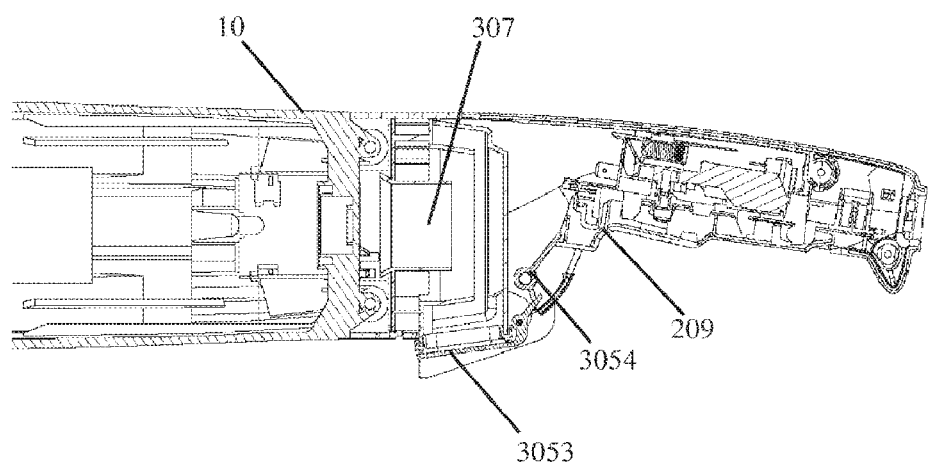
FIG. 7 is a schematic partial cross-sectional structural view showing the cover of FIG. 5 in a closed state.

The cover 3053 in the first embodiment described above is not arranged in a particular manner as long as it can be attracted to be closed under the negative pressure, while in other embodiments, a control switch can be separately provided, and even the cover can be provided in the form of being in linkage with the existing motor control switch. For example, referring to a second embodiment shown in FIG. 6 and FIG. 7, the electric tool 100 has a switch 209 for controlling the start-up of the electric motor 205, and the cyclone dust collecting chamber 305 further comprises a cover 3053 which can be in linkage with the switch 209 to close the particle discharge port 3051. The switch 209 uses a swing link 3054 to set, in a linkage manner, the start and stop of the electric motor 205 and the opening and closing of the cover 3053 as: before the electric motor 205 is started, the cover 3053 is closed first; and before the cover 3053 is opened, the electric motor 205 is stopped first. The cyclone separation unit 30 is preferably located between the electric motor 205 and the switch 209, which not only facilitates the arrangement of a linkage mechanism, but also is independent of the tool assembly 20, and does not require disassembly of the main portion of the housing 10 during processing.

The above specific embodiments are merely illustrative of the present application and are not intended to limit the present application. For example, the end output shaft and the electric motor in this embodiment are driven therebetween by a gear set, but in other applications, other forms of driving may also be used, even directly using motor drive. Furthermore, the above specific embodiments mainly introduce the application of the present application on the angle grinder, and in fact, the cyclone separation unit can be more widely used as an air pre-cleaning assembly in the field of electric hammers, circular saws, electric drills, cutting machines or even non-electric tools. A basic application state is: the air pre-cleaning assembly comprises an electric motor having a stator and a rotor shaft assembly that is assembled with a fan, wherein the electric motor is located upstream of the fan; the rotation of the fan can generate airflow passing through the electric motor; a cyclone separation unit is disposed in the path of the airflow upstream of the electric motor; and the cyclone separation unit comprises an air inlet, a cyclone separation chamber communicating with the air inlet, a cyclone dust collecting chamber communicating with the cyclone separation chamber and located at the outer periphery of the cyclone separation chamber, and an air outlet communicating with the cyclone separation chamber and located at the inner periphery of the cyclone separation chamber, with the air outlet communicating with the electric motor.

In summary, various changes and modifications can be made by a person of ordinary skill in the art without departing from the scope of the present application. Therefore, all equivalent technical solutions are also within the scope of the present application, and the scope of protection of the present application should be defined by the claims.

The invention claimed is:

1. An electric tool, comprising:
a housing defining a plurality of intake grilles; and
a tool assembly including:
an end output shaft configured to clamp a cutting, drilling, or grinding accessory,
an electric motor arranged inside the housing and configured to directly or indirectly drive the end output shaft, the electric motor including a stator and a rotor shaft assembly, the rotor shaft assembly including a fan configured to generate an airflow that flows through the electric motor, and
a cyclone separation unit disposed in a path of the airflow upstream of the electric motor, the cyclone separation unit comprising:
a plurality of air inlets distributed around the cyclone separation unit in a circumferential direction, each of the plurality of air inlets being aligned with an associated intake grille of the plurality of intake grilles;
a cyclone separation chamber communicating with the plurality of air inlets, each of the plurality of air inlets oriented so as to direct air from the associated intake grille into the cyclone separation chamber in a tangential direction;
a cyclone dust collecting chamber communicating with the cyclone separation chamber and located at an outer periphery of the cyclone separation chamber; and
an air outlet communicating with the cyclone separation chamber and located at an inner periphery of the cyclone separation chamber, the electric motor located downstream of the air outlet such that the airflow passes from the air outlet through the electric motor.

2. The electric tool as claimed in claim 1, wherein the airflow flows through one or more of a stator-rotor gap of the electric motor and a motor-housing backlash.

3. The electric tool as claimed in claim 1, wherein the cyclone dust collecting chamber has a particle discharge port.

4. The electric tool as claimed in claim 3, wherein the cyclone dust collecting chamber further comprises a cover configured such that negative pressure generated by the airflow during operation of the fan causes the cover to close the particle discharge port.

5. The electric tool as claimed in claim 3, wherein the end output shaft is perpendicular to the rotor shaft assembly, the end output shaft has a free end facing a working side, and the particle discharge port is configured to open to the working side.

6. The electric tool as claimed in claim 5, wherein the cyclone dust collecting chamber extends to the working side to form an extended dust collecting chamber, and the particle discharge port is disposed at a lower portion of the extended dust collecting chamber.

7. The electric tool as claimed in claim 1, wherein the cyclone separation unit is prefabricated as a unit that is configured to be removable from the electric tool.

8. The electric tool as claimed in claim 1, wherein an inner wall of the cyclone dust collecting chamber has a plurality of strip-shaped or spot-shaped protrusions that promote sedimentation of particles.

9. The electric tool as claimed in claim 1, wherein at least part of the cyclone dust collecting chamber is exposed outside the housing and is configured as a see-through chamber allowing the amount of dust collected to be observed.

10. The electric tool as claimed in claim 1, wherein the electric tool is an angle grinder, an electric hammer, a circular saw, an electric drill, or a cutting machine.

11. An electric tool, comprising:
a housing; and
a tool assembly assembled on the housing, the tool assembly including:
an end output shaft configured to clamp an accessory,
an electric motor configured to directly or indirectly drive the end output shaft, the electric motor including a stator and a rotor shaft assembly, the rotor shaft assembly including a fan configured to generate an airflow that flows through the electric motor, and
a cyclone separation unit disposed in a path of the airflow upstream of the electric motor, the cyclone separation unit including an air inlet, a cyclone separation chamber communicating with the air inlet, a cyclone dust collecting chamber communicating with the cyclone separation chamber and located at an outer periphery of the cyclone separation chamber, and an air outlet communicating with the cyclone separation chamber and located at an inner periphery of the cyclone separation chamber, the electric motor located downstream of the air outlet, wherein:
the cyclone dust collecting chamber has a particle discharge port,
the electric tool has a switch configured to control the start-up of the electric motor, and
the cyclone dust collecting chamber further comprises a cover configured to be in linkage with the switch to open and close the particle discharge port.

12. The electric tool as claimed in claim 11, wherein the switch sets, in a linkage manner, the start and stop of the electric motor and the opening and closing of the cover such that (i) before the electric motor is started, the cover is closed first and (ii) before the cover is opened, the electric motor is stopped first.

13. The electric tool as claimed in claim 11, wherein the cyclone separation unit has several air inlets distributed in a circumferential direction, and the air inlets enter the cyclone separation chamber in a tangential direction.

14. The electric tool as claimed in claim 13, wherein the housing has several intake grilles, each of which aligns with a corresponding one of the several air inlets.

15. An air pre-cleaning assembly, comprising:
an electric motor arranged inside a housing of a tool in which the air pre-cleaning assembly is mounted and configured to directly or indirectly drive an end output shaft, which is configured to clamp a cutting, drilling, or grinding accessory, of the tool, the electric motor having a stator and a rotor shaft assembly that is assembled with a fan, the electric motor located upstream of the fan, and a rotation of the fan configured to produce an airflow that flows through the electric motor; and
a cyclone separation unit disposed in a path of the airflow upstream of the electric motor, the cyclone separation unit comprising:
a plurality of air inlets distributed around the cyclone separation unit in a circumferential direction, each of the plurality of air inlets being aligned with an associated intake grille defined in the housing of the tool;
a cyclone separation chamber communicating with the plurality of air inlets, each of the plurality of air inlets oriented so as to direct air from the associated intake grille into the cyclone separation chamber in a tangential direction;
a cyclone dust collecting chamber communicating with the cyclone separation chamber and located at an outer periphery of the cyclone separation chamber; and
an air outlet communicating with the cyclone separation chamber and located at an inner periphery of the cyclone separation chamber, the electric motor located downstream of the air outlet such that the airflow passes from the air outlet through the electric motor.

16. The air pre-cleaning assembly as claimed in claim 15, wherein the cyclone dust collecting chamber has a particle discharge port.

17. The air pre-cleaning assembly as claimed in claim 16, wherein the cyclone dust collecting chamber further comprises a cover that is configured to open and close the particle discharge port actively or passively.

* * * * *